US012347349B2

(12) United States Patent
Gangopadhyay et al.

(10) Patent No.: US 12,347,349 B2
(45) Date of Patent: Jul. 1, 2025

(54) INTRA-FRAME INTERPOLATION BASED LINE-BY-LINE TUNING FOR ELECTRONIC DISPLAYS

(71) Applicant: Apple Inc., Cupertino, CA (US)

(72) Inventors: Daibashish Gangopadhyay, San Jose, CA (US); Fenghua Zheng, San Jose, CA (US)

(73) Assignee: Apple Inc., Cupertino, CA (US)

( * ) Notice: Subject to any disclaimer, the term of this patent is extended or adjusted under 35 U.S.C. 154(b) by 269 days.

(21) Appl. No.: 17/003,719

(22) Filed: Aug. 26, 2020

(65) Prior Publication Data

US 2021/0097909 A1 Apr. 1, 2021

Related U.S. Application Data

(60) Provisional application No. 62/906,552, filed on Sep. 26, 2019.

(51) Int. Cl.
*G09G 3/36* (2006.01)
*G02F 1/1343* (2006.01)
*G09G 3/00* (2006.01)
*G09G 5/02* (2006.01)

(52) U.S. Cl.
CPC ..... *G09G 3/006* (2013.01); *G09G 2320/0247* (2013.01); *G09G 2330/12* (2013.01)

(58) Field of Classification Search
CPC ........... G09G 3/006; G09G 2320/0247; G09G 2330/12
See application file for complete search history.

(56) References Cited

U.S. PATENT DOCUMENTS

| | | | | |
|---|---|---|---|---|
| 2007/0229447 A1 | 10/2007 | Takahara et al. | | |
| 2008/0225031 A1* | 9/2008 | Tseng | G09G 3/3655 | 345/211 |
| 2010/0301904 A1* | 12/2010 | Chen | G09G 3/3688 | 327/103 |
| 2012/0113084 A1* | 5/2012 | Yang | G09G 3/3655 | 345/212 |
| 2016/0260407 A1* | 9/2016 | Zheng | G09G 3/3655 | |
| 2017/0186375 A1* | 6/2017 | Jung | G09G 3/3233 | |
| 2019/0346960 A1* | 11/2019 | Liang | G09G 3/3696 | |
| 2020/0090605 A1* | 3/2020 | Kang | G09G 3/3614 | |

FOREIGN PATENT DOCUMENTS

| | | | |
|---|---|---|---|
| CN | 205140484 U * | 4/2016 | G09G 3/00 |
| CN | 106169281 A * | 11/2016 | G09G 3/20 |
| CN | 109215610 A | 1/2019 | |
| JP | 2013225004 A | 10/2013 | |
| KR | 20170071220 | 6/2017 | |

* cited by examiner

*Primary Examiner* — Lin Li
(74) *Attorney, Agent, or Firm* — Fletcher Yoder, P.C.

(57) ABSTRACT

A system includes processing circuitry configured to determine a plurality of line-specific common voltage (Vcom) values for a plurality of common electrodes of an electronic display. Each of the plurality of line-specific Vcom values is associated with a line of pixels of a plurality of lines of pixels of the electronic display. Additionally, the processing circuitry is configured to cause the plurality of line-specific Vcom values to be provided to the plurality of lines of pixels.

14 Claims, 9 Drawing Sheets

INTRA-FRAME INTERPOLATION BASED LINE-BY-LINE TUNING FOR ELECTRONIC DISPLAYS

CROSS-REFERENCE TO RELATED APPLICATIONS

This application claims the benefit of U.S. Patent Application No. 62/906,552, entitled "Intra-Frame Interpolation Based Line-by-Line Tuning for Electronic Displays," filed on Sep. 26, 2019, which is incorporated by reference herein in its entirety for all purposes.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to providing line-specific common voltages (Vcoms), which may reduce or eliminate the occurrence of visual artifacts, such as screen flicker. Visual artifacts may reduce the clarity or perceived image quality of the information presented to a person by an electronic display. In some cases, visual artifacts may occur due to a common Vcom voltage being applied to the pixels of an electronic display. For instance, different portions of the electronic display may have different properties, meaning different Vcoms may be more likely to reduce image artifacts that might otherwise appear in different portions of the electronic display.

As described below, different Vcom values associated with different regions of a display may be determined that are likely to reduce image artifacts that might otherwise appear. Different Vcom values for groups of the regions (e.g., rows of regions) may also be determined that are likely to reduce image artifacts that might otherwise appear. These different (e.g, optimal) Vcom values for lines of pixels throughout the display may be determined by interpolating a curve (e.g., a flicker curve) associated with the regions, and these Vcoms may be provided to the pixels of the display. As such, a Vcom that is tailored for each particular line of pixels in an electronic display may be provided, which may reduce and/or eliminate the occurrence of flickering that is perceivable to the human eye.

Various refinements of the features noted above may be made in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
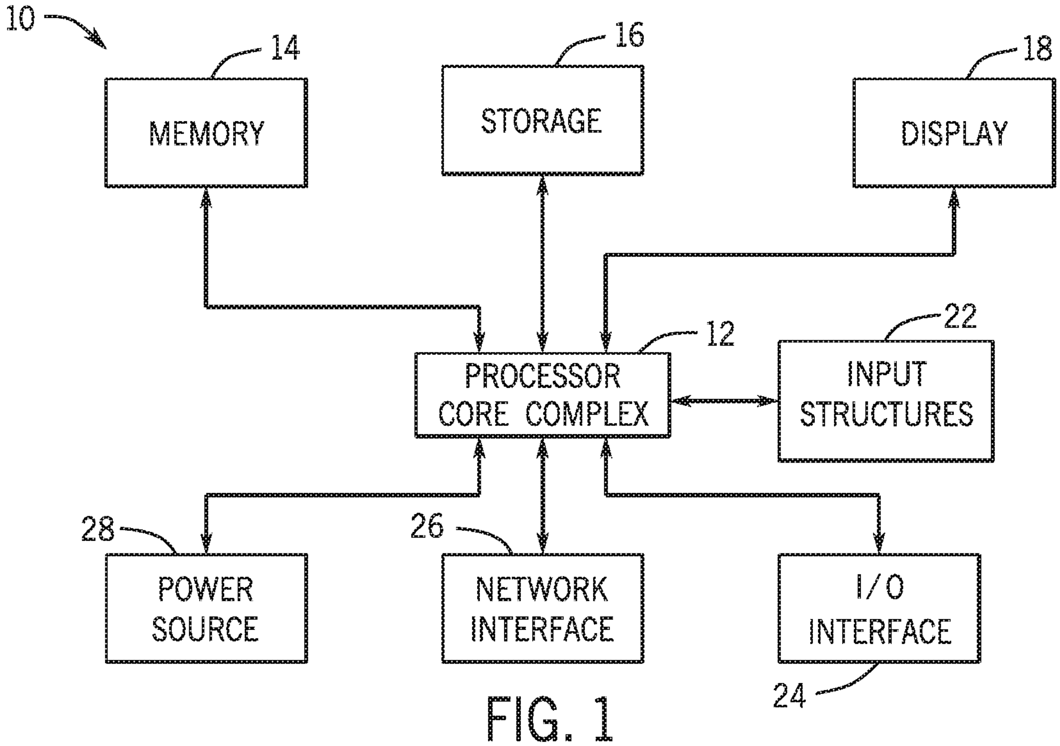
FIG. 1 is a schematic block diagram of an electronic device, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

Electronic displays are ubiquitous in modern electronic devices. As electronic displays gain ever-higher resolutions and dynamic range capabilities, image quality has increasingly grown in value. In general, electronic displays contain numerous picture elements, or "pixels," that are programmed with image data. Each pixel emits a particular amount of light based at least in part on the image data. By programming different pixels with different image data, graphical content including images, videos, and text can be displayed.

In certain types of electronic displays, such as liquid crystal displays, a common voltage (Vcom) may be applied to pixels included the displays. In some cases, visual artifacts, such as flickering, may be perceived by users of the electronic device due to different portions or regions of the display having different characteristics (e.g., resistance, capacitance, differences in the liquid crystals). For instance, when a single Vcom is applied to all of the pixels of an electronic display, flickering may occur due to the different characteristics of the different areas of the display. Additionally, Vcom may drift over time. For example, due to extended continuous operation of an electronic display, improper discharge of the pixels or imperfections in the electronic display may cause charge accumulation to occur, which may cause an optimal Vcom (e.g., a Vcom value that would reduce a likelihood of image artifacts) for different portions of the electronic display 18 to change. Such a drift (e.g., the amount of change in optimal Vcom) may differ for different portions of the electronic display 18. Over time, regions of the electronic display 18 may have a Vcom that differs enough from an optimal Vcom to cause flickering that can be perceived by the human eye to occur. As used herein, "optimal Vcom" refers to a Vcom voltage that, when used in a particular area or region of the electronic display 18, would reduce the appearance of image artifacts as compared to another Vcom.

As discussed below, presently disclosed techniques enable line-specific Vcoms to be determined and supplied to lines of pixels included in electronic displays. For instance, the line-specific Vcom values may be interpolated based at least in part on optimal Vcom values that are determined for various regions of the display. By providing line-specific Vcom voltages, the techniques discussed below may provide higher resilience to Vcom drift over time by enabling each line of pixels to have its own specific Vcom. Furthermore, the techniques provided herein may reduce or eliminate the occurrence of flickering.

Figure 2:
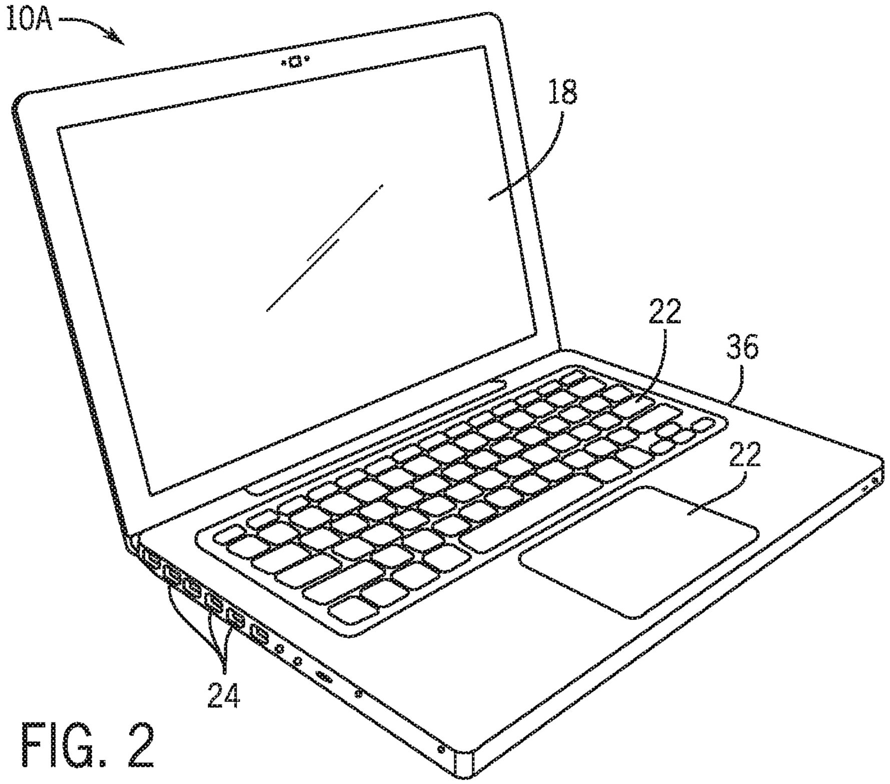
FIG. 2 is a perspective view of a notebook computer representing an embodiment of the electronic device of FIG. 1.
Figure 4:
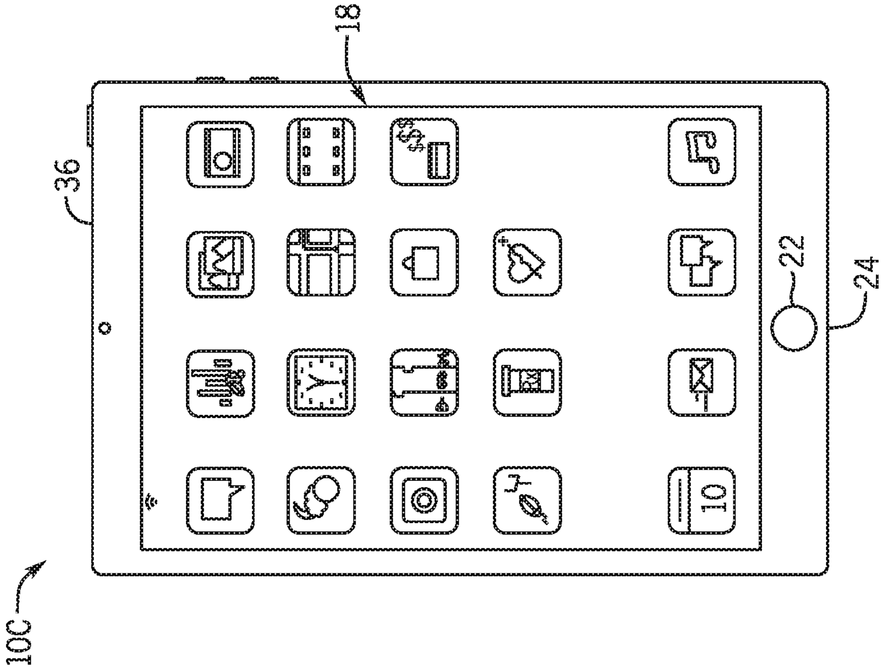
FIG. 4 is a front view of another hand-held device representing another embodiment of the electronic device of FIG. 1.
Figure 3:
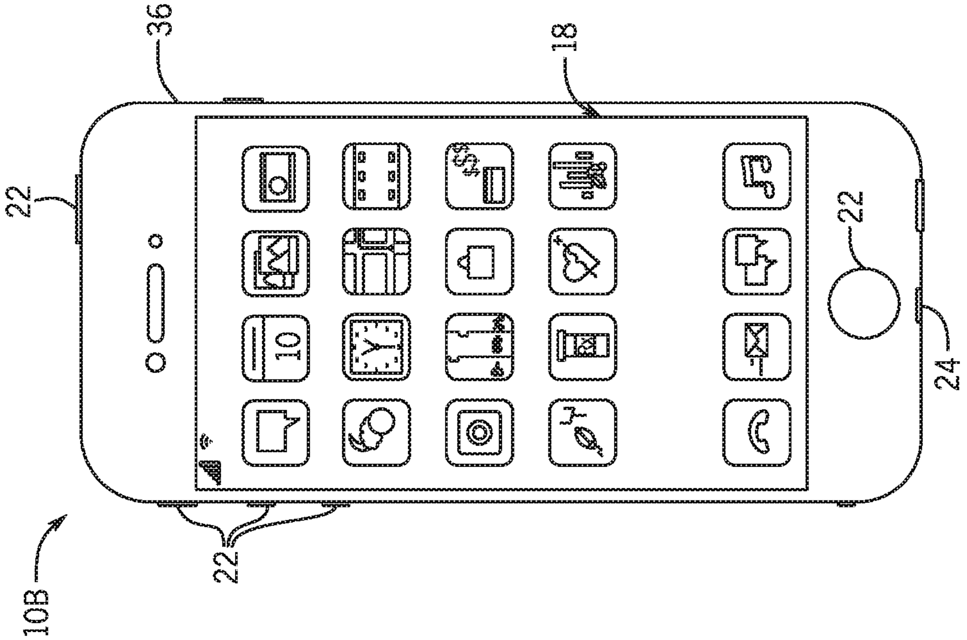
FIG. 3 is a front view of a hand-held device representing another embodiment of the electronic device of FIG. 1.
Figure 5:
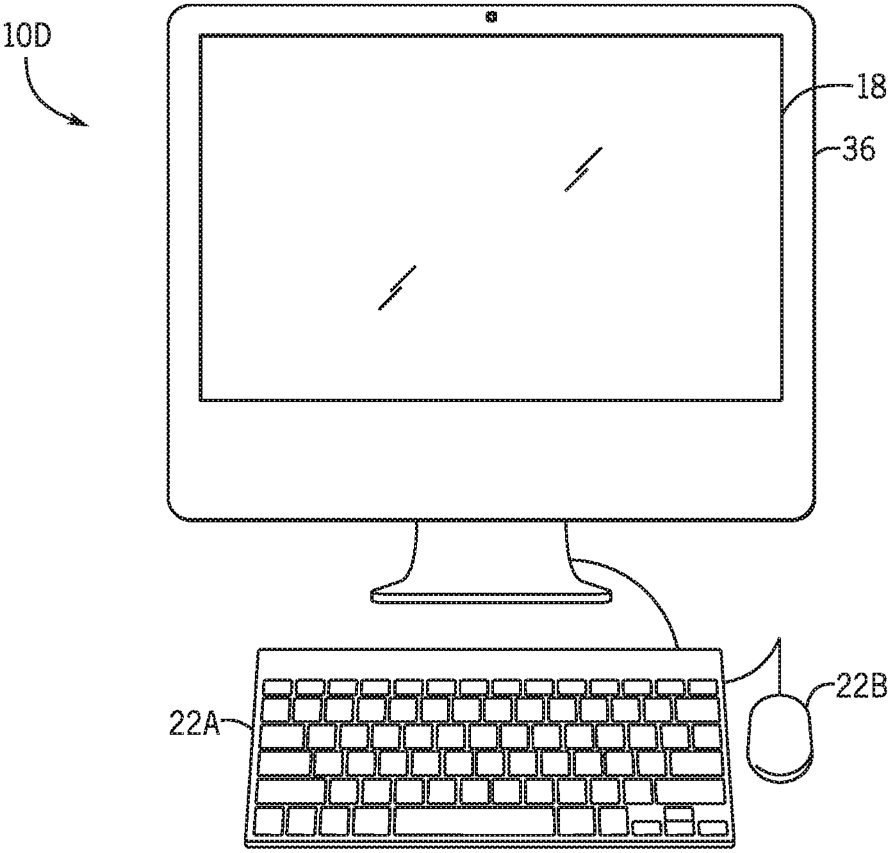
FIG. 5 is a front view of a desktop computer representing another embodiment of the electronic device of FIG. 1.
Figure 6:
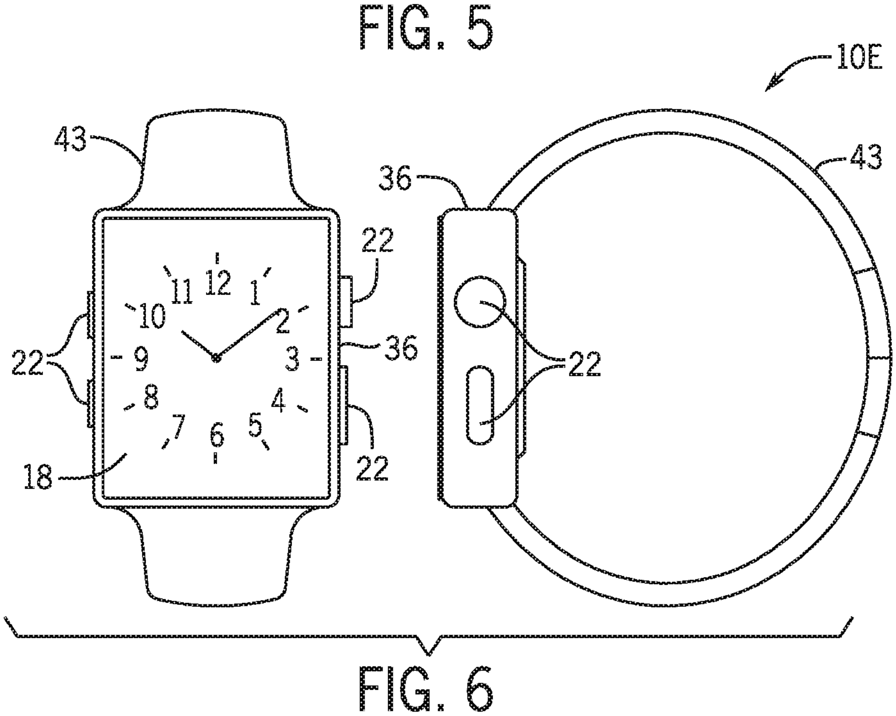
FIG. 6 is a front view and side view of a wearable electronic device representing another embodiment of the electronic device of FIG. 1.

With this in mind, a block diagram of an electronic device 10 is shown in FIG. 1. As will be described in more detail below, the electronic device 10 may represent any suitable electronic device, such as a computer, a mobile phone, a portable media device, a tablet, a television, a virtual-reality headset, a vehicle dashboard, or the like. The electronic device 10 may represent, for example, a notebook computer 10A as depicted in FIG. 2, a handheld device 10B as depicted in FIG. 3, a handheld device 10C as depicted in FIG. 4, a desktop computer 10D as depicted in FIG. 5, a wearable electronic device 10E as depicted in FIG. 6, or a similar device.

The electronic device 10 shown in FIG. 1 may include, for example, a processor core complex 12, a local memory 14, a main memory storage device 16, an electronic display 18, input structures 22, an input/output (I/O) interface 24, network interfaces 26, and a power source 28. The various functional blocks shown in FIG. 1 may include hardware elements (including circuitry), software elements (including machine-executable instructions stored on a tangible, non-transitory medium, such as the local memory 14 or the main memory storage device 16) or a combination of both hardware and software elements. It should be noted that FIG. 1 is merely one example of a particular implementation and is intended to illustrate the types of components that may be present in electronic device 10. Indeed, the various depicted components may be combined into fewer components or separated into additional components. For example, the local memory 14 and the main memory storage device 16 may be included in a single component.

The processor core complex 12 may carry out a variety of operations of the electronic device 10, such as provide image data for display on the electronic display 18. The processor core complex 12 may include any suitable data processing circuitry to perform these operations, such as one or more microprocessors, one or more application specific processors (ASICs), or one or more programmable logic devices (PLDs). In some cases, the processor core complex 12 may execute programs or instructions (e.g., an operating system or application program) stored on a suitable article of manufacture, such as the local memory 14 and/or the main memory storage device 16. In addition to instructions for the processor core complex 12, the local memory 14 and/or the main memory storage device 16 may also store data to be processed by the processor core complex 12. By way of example, the local memory 14 may include random access memory (RAM) and the main memory storage device 16 may include read only memory (ROM), rewritable non-volatile memory such as flash memory, hard drives, optical discs, or the like.

The electronic display 18 may display image frames, such as a graphical user interface (GUI) for an operating system or an application interface, still images, or video content. The processor core complex 12 may supply at least some of the image frames. The electronic display 18 may be a self-emissive display, such as an organic light emitting diodes (OLED) display, or may be a liquid crystal display (LCD) illuminated by a backlight. In some embodiments, the electronic display 18 may include a touch screen, which may allow users to interact with a user interface of the electronic device 10.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26. The network interface 26 may include, for example, interfaces for a personal area network (PAN), such as a Bluetooth network, for a local area network (LAN) or wireless local area network (WLAN), such as an 802.11x Wi-Fi network, and/or for a wide area network (WAN), such as a cellular network. The network interface 26 may also include interfaces for, for example, broadband fixed wireless access networks (WiMAX), mobile broadband Wireless networks (mobile WiMAX), asynchronous digital subscriber lines (e.g., ADSL, VDSL), digital video broadcasting-terrestrial (DVB-T) and its extension DVB Handheld (DVB-H), ultra-wideband (UWB), alternating current (AC) power lines, and so forth. The power source 28 may include any suitable source of power, such as a rechargeable lithium polymer (Li-poly) battery and/or an alternating current (AC) power converter.

In certain embodiments, the electronic device 10 may take the form of a computer, a portable electronic device, a wearable electronic device, or other type of electronic device. Such computers may include computers that are generally portable (such as laptop, notebook, and tablet computers) as well as computers that are generally used in one place (such as conventional desktop computers, workstations and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 10A, is illustrated in FIG. 2 in accordance with one embodiment of the present disclosure. The depicted computer 10A may include a housing or enclosure 36, an electronic display 18, input structures 22, and ports of an I/O interface 24. In one embodiment, the input structures 22 (such as a keyboard and/or touchpad) may be used to interact with the computer 10A, such as to start, control, or operate a GUI or applications running on computer 10A. For example, a keyboard and/or touchpad may allow a user to navigate a user interface or application interface displayed on the electronic display 18.

FIG. 3 depicts a front view of a handheld device 10B, which represents one embodiment of the electronic device 10. The handheld device 10B may represent, for example, a portable phone, a media player, a personal data organizer, a handheld game platform, or any combination of such devices. By way of example, the handheld device 10B may be a model of an iPod® or iPhone® available from Apple Inc. of Cupertino, California. The handheld device 10B may include an enclosure 36 to protect interior components from physical damage and to shield them from electromagnetic interference. The enclosure 36 may surround the electronic display 18. The I/O interfaces 24 may open through the enclosure 36 and may include, for example, an I/O port for a hard wired connection for charging and/or content manipulation using a standard connector and protocol, such as the Lightning connector provided by Apple Inc., a universal serial bus (USB), or other similar connector and protocol.

User input structures 22, in combination with the electronic display 18, may allow a user to control the handheld device 10B. For example, the input structures 22 may activate or deactivate the handheld device 10B, navigate user interface to a home screen, a user-configurable application screen, and/or activate a voice-recognition feature of the handheld device 10B. Other input structures 22 may provide volume control, or may toggle between vibrate and ring modes. The input structures 22 may also include a microphone that may obtain a user's voice for various voice-related features, and a speaker that may enable audio playback and/or certain phone capabilities. The input structures 22 may also include a headphone input that may provide a connection to external speakers and/or headphones.

FIG. 4 depicts a front view of another handheld device 10C, which represents another embodiment of the electronic device 10. The handheld device 10C may represent, for example, a tablet computer or portable computing device. By way of example, the handheld device 10C may be a tablet-sized embodiment of the electronic device 10, which may be, for example, a model of an iPad® available from Apple Inc. of Cupertino, California.

Turning to FIG. 5, a computer 10D may represent another embodiment of the electronic device 10 of FIG. 1. The computer 10D may be any computer, such as a desktop computer, a server, or a notebook computer, but may also be a standalone media player or video gaming machine. By way of example, the computer 10D may be an iMac®, a MacBook®, or other similar device by Apple Inc. It should be noted that the computer 10D may also represent a personal computer (PC) by another manufacturer. A similar enclosure 36 may be provided to protect and enclose internal components of the computer 10D such as the electronic display 18. In certain embodiments, a user of the computer 10D may interact with the computer 10D using various peripheral input devices, such as input structures 22A or 22B (e.g., keyboard and mouse), which may connect to the computer 10D.

Similarly, FIG. 6 depicts a wearable electronic device 10E representing another embodiment of the electronic device 10 of FIG. 1 that may be configured to operate using the techniques described herein. By way of example, the wearable electronic device 10E, which may include a wristband 43, may be an Apple Watch® by Apple Inc. However, in other embodiments, the wearable electronic device 10E may include any wearable electronic device such as, for example, a wearable exercise monitoring device (e.g., pedometer, accelerometer, heart rate monitor), or other device by another manufacturer. The electronic display 18 of the wearable electronic device 10E may include a touch screen display 18 (e.g., LCD, OLED display, active-matrix organic light emitting diode (AMOLED) display, and so forth), as well as input structures 22, which may allow users to interact with a user interface of the wearable electronic device 10E.

Figure 7:
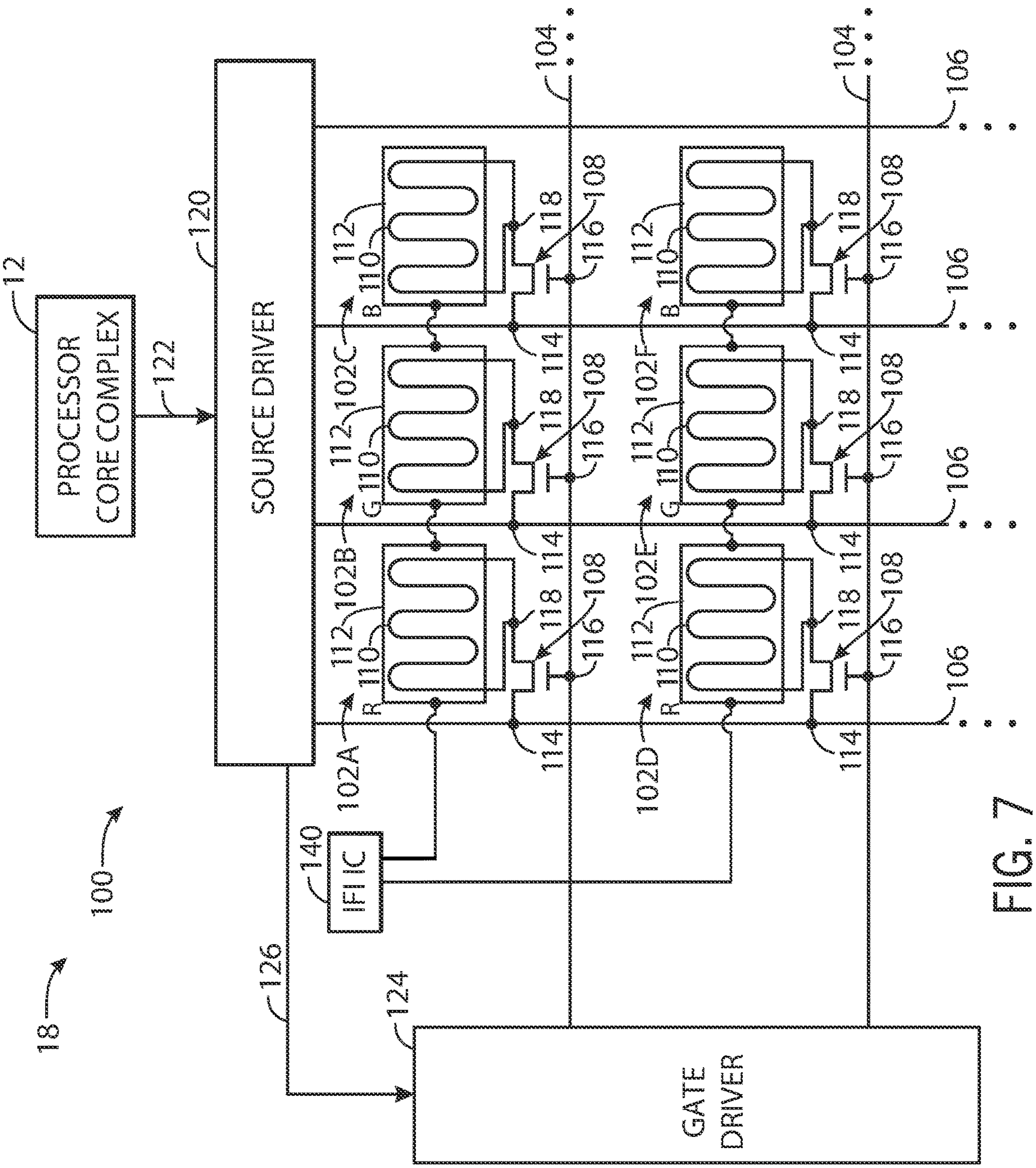
FIG. 7 is a block diagram of the electronic display of FIG. 1, in accordance with an embodiment.

Among the various components of the electronic display 18 may be a pixel array 100, as shown in FIG. 7. As illustrated, FIG. 7 generally represents a circuit diagram of certain components of the electronic display 18 in accordance with an embodiment. In particular, the pixel array 100 of the electronic display 18 may include a number of unit pixels 102 disposed in a pixel array or matrix. In such an array, each unit pixel 102 may be defined by the intersection of rows and columns, represented by gate lines 104 (also referred to as scanning lines), and source lines 106 (also referred to as data lines), respectively. Although only six unit pixels 102, referred to individually by the reference numbers 102A-102F, respectively, are shown for purposes of simplicity, it should be understood that in an actual implementation, each source line 106 and gate line 104 may include hundreds or thousands of such unit pixels 102. Each of the unit pixels 102 may represent one of three subpixels that respectively filters only one color (e.g., red, blue, or green) of light. For purposes of the present disclosure, the terms "pixel," "subpixel," and "unit pixel" may be used largely interchangeably.

In the presently illustrated embodiment, each unit pixel 102 includes an oxide thin film transistor (TFT) 108 for switching a data signal supplied to a respective pixel electrode 110. However, it should be noted that, in other embodiments, other types of transistors may be utilized instead of oxide TFTs. The potential stored on the pixel electrode 110 relative to a potential of a common electrode 112, which may be shared by other pixels 102 (e.g., pixels 102 included in a line or row of pixels 102), may generate an electrical field sufficient to alter the arrangement of a liquid crystal layer of the electronic display 18. In the depicted embodiment of FIG. 4, a source 114 of each oxide TFT 108 may be electrically connected to a source line 106 and a gate 116 of each oxide TFT 108 may be electrically connected to a gate line 104. A drain 118 of each oxide TFT 108 may be electrically connected to a respective pixel electrode 110. Each oxide TFT 108 may serve as a switching element that may be activated and deactivated (e.g., turned on and off) for a period of time based at least in part on the respective presence or absence of a scanning or activation signal on the gate lines 104 that are applied to the gates 116 of the oxide TFTs 108.

When activated, an oxide TFT 108 may store the image signals received via the respective source line 106 as a charge upon its corresponding pixel electrode 110. As noted above, the image signals stored by the pixel electrode 110 may be used to generate an electrical field between the respective pixel electrode 110 and a common electrode 112. This electrical field may align the liquid crystal molecules within the liquid crystal layer to modulate light transmission through the pixel 102. Thus, as the electrical field changes, the amount of light passing through the pixel 102 may increase or decrease. In general, light may pass through the unit pixel 102 at an intensity corresponding to the applied voltage from the source line 106.

The electronic display 18 also may include a source driver integrated circuit (IC) 120, which may include a processor, microcontroller, or application specific integrated circuit (ASIC), that controls the display pixel array 100 by receiving image data 122 from the processor core complex 12 and sending corresponding image signals to the unit pixels 102 of the pixel array 100. It should be understood that the source driver 120 may be a chip-on-glass (COG) component on a TFT glass substrate, a component of a display flexible printed circuit (FPC), and/or a component of a printed circuit board (PCB) that is connected to the TFT glass substrate via the display FPC. Further, the source driver 120 may include any suitable article of manufacture having one or more tangible, computer-readable media for storing instructions that may be executed by the source driver 120.

The source driver 120 also may couple to a gate driver integrated circuit (IC) 124 that may activate or deactivate rows of unit pixels 102 via the gate lines 104. As such, the source driver 120 may provide timing signals 126 to the gate driver 124 to facilitate the activation/deactivation of individual rows (i.e., lines) of pixels 102. In other embodiments, timing information may be provided to the gate driver 124 in some other manner. The electronic display 18 may include an intra-frame interpolation integrated circuit (IC) 140 that causes a Vcom output to be provided to the common electrodes 112 (e.g., via a voltage source). The intra-frame interpolation IC 140 may be communicatively coupled to the local memory 14 and the main memory storage device 16 and include processing circuitry, such as a microprocessor or programmable logic device, that executes instructions stored on the local memory 14 or the main memory storage device 16. For example, the main memory storage device 16 may include intra-frame interpolation parameters discussed below as well as instructions that, when executed, cause the intra-frame interpolation IC 140 to perform intra-frame interpolation and cause Vcom voltages to be supplied to lines of pixels 102 (e.g., to common electrodes 112 of a line of pixels 102). In some embodiments, the intra-frame interpolation IC 140 may supply a different Vcom to different common electrodes 112 at different times. In other embodiments, the common electrodes 112 all may be maintained at the same potential (e.g., a ground potential) while the electronic display 18 is on.

As elaborated upon in greater detail below, each row of pixels 102 may be supplied with a different potential by the intra-frame interpolation IC 140. For example, pixels 102A-C may be provided one Vcom by the intra-frame interpolation IC 140, and the intra-frame interpolation IC 140 may supply a different Vcom to the pixels 102D-F. In other words, each line of pixels 102 included in the electronic display 18 may be provided with a particular Vcom by the intra-frame interpolation IC 140. By providing line-specific Vcoms, the occurrence of flickering or other visual artifacts perceptible to the human eye may be reduced or eliminated.

In particular, flickering may be perceived by the human eye due to several factors. As one example, various portions of the electronic display 18 may have different electronic characteristics. For example, pixels 102 that are located farther away from the intra-frame interpolation IC 140 (or a voltage source associated with the intra-frame interpolation IC 140) may have a different (e.g., higher) resistance compared to pixels 102 that are located relatively closer to the intra-frame interpolation IC 140 (or a voltage source associated with the intra-frame interpolation IC 140). The differences in resistance may lead to variability in a potentially optimal Vcom values for the different portions of the electronic display 18 having different resistances. Accordingly, when a common Vcom (e.g., a single Vcom) is provided to each of the pixels 102, that common Vcom may be more optimal for some of the pixels 102 compared to other pixels 102. For example, some pixels 102 provided with the common Vcom may not cause flickering, whereas other pixels 102 may produce visually perceptible levels of flickering due to the common Vcom.

Moreover, Vcom may drift over time. For example, due to extended continuous operation of the electronic display 18, improper discharge of the pixels 102, or imperfections in the electronic display 18, charge accumulation may occur, which may cause an optimal Vcom for different portions of the electronic display 18 to change. Such a drift (e.g., the amount of change in optimal Vcom) may differ for different portions of the electronic display 18. Over time, regions of the electronic display 18 may have a Vcom that differs enough from an optimal Vcom to cause flickering that can be perceived by the human eye to occur.

Accordingly, to reduce or eliminate the occurrence of perceivable screen flicker, the techniques discussed herein may be utilized to enable line-by-line Vcom tuning of the pixels 102 of the electronic display 18. For example, the techniques discussed below may provide higher resilience to Vcom drift by enabling each line of pixels 102 to have its own specifically determined Vcom.

Figure 8:
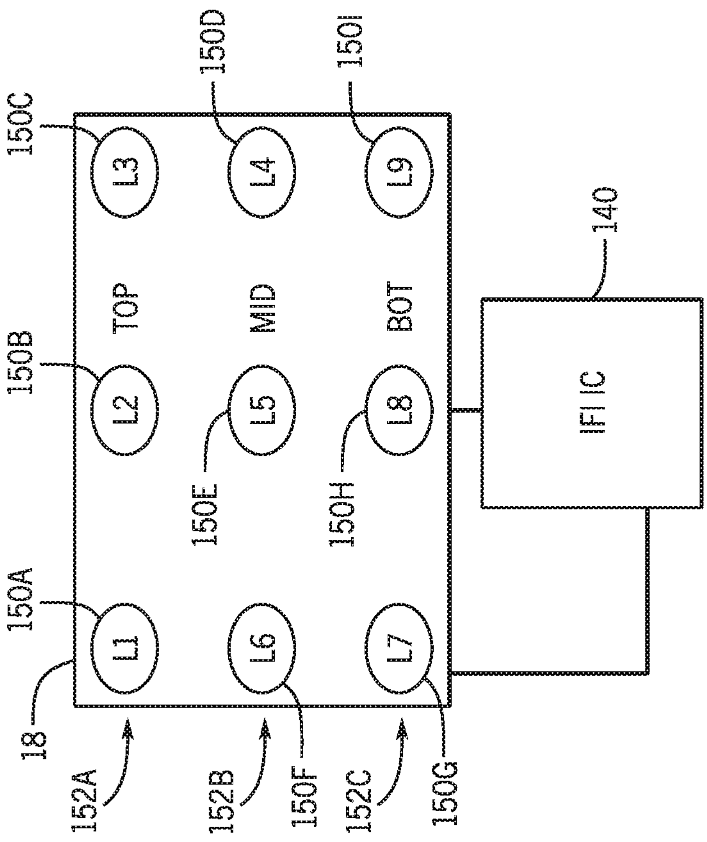
FIG. 8 is a block diagram of the electronic display and the intra-frame interpolation integrated circuit of FIG. 7, in accordance with an embodiment.

Keeping this in mind, FIG. 8 illustrates a block diagram of the electronic display 18 and the intra-frame interpolation integrated circuit (IC) 140 that is communicatively coupled to the electronic display 18. Regions 150 (e.g., regions 150A-I) of the electronic display 18 are depicted. Each of the regions 150 may be a particular portion of the electronic display 18, such as an area of the electronic display 18 near a corner, side, or center of the electronic display 18. The regions 150 may also be associated with rows and columns of the pixels 102 of the electronic display 18. Generally speaking, the regions 150 may be arranged in rows 152. For example, regions 150A-C may be included in a top row 152A, regions 150D-F may be included in a middle row 152B, and regions 150G-I may be included in a bottom row 152C. While three rows 152 are depicted in FIG. 8, it should be noted that, in other embodiments, more than three rows 152 may be utilized. Similarly, in other embodiments, fewer than three rows 152 may be used. Furthermore, more or fewer than nine regions 150 may be utilized in some embodiments.

As discussed below, an optimal Vcom for each region 150 may be determined. The optimal Vcoms for each region 150 of a row 152 may be utilized to determine an optimal Vcom for the particular row 152. More specifically, the intra-frame interpolation IC 140 may perform intra-frame interpolation to determine an optimal Vcom for a particular row of pixels 102 by interpolating between optimal Vcoms associated with two rows 152 between which the row of pixels 102 is located. In other words, based at least in part on the location of a particular row of pixels 102 of the electronic display 18 and optimal Vcom values for two rows 152 that the row of pixels 102 lies between, a line-specific Vcom may be determined and utilized.

Figure 9:
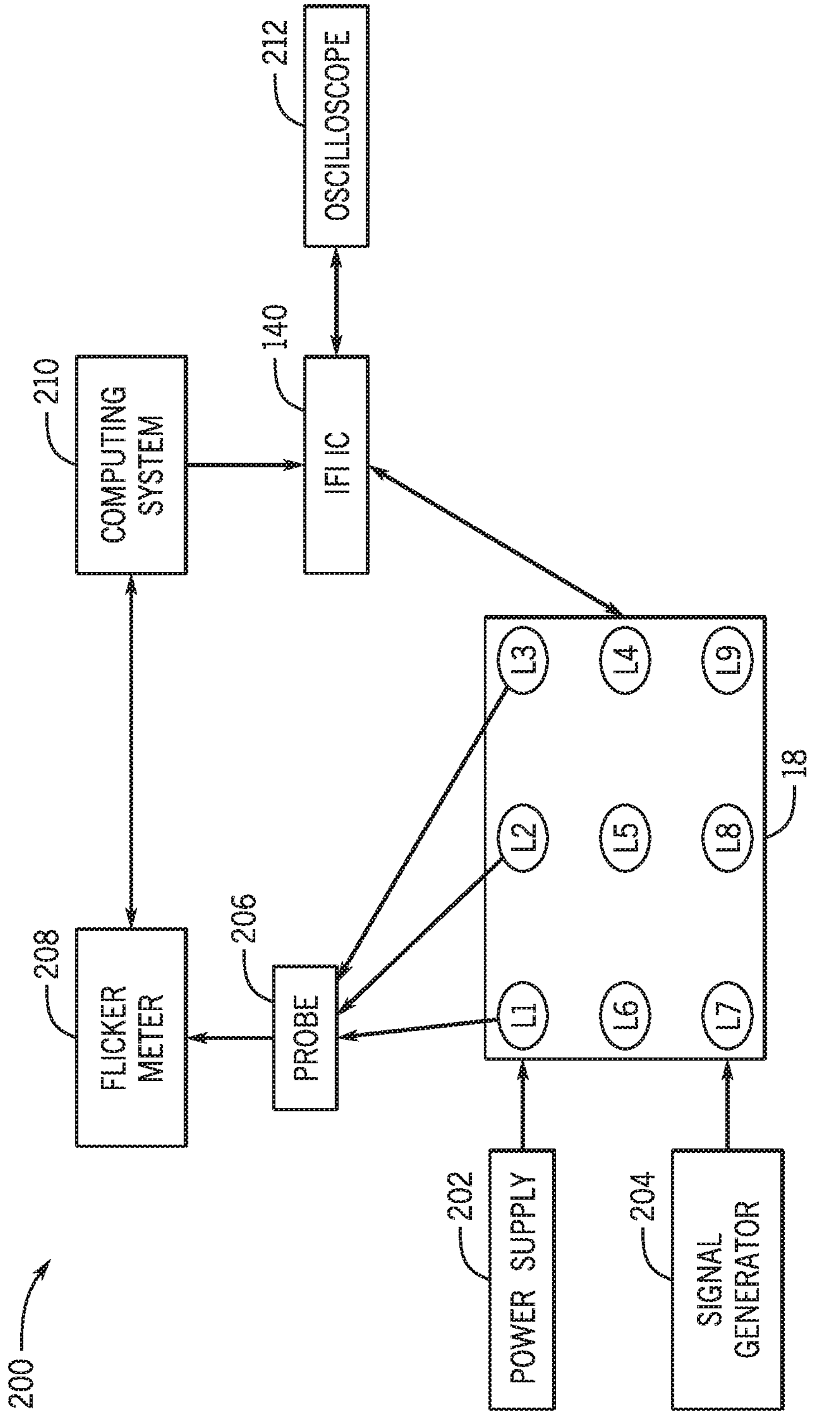
FIG. 9 illustrates a Vcom calibration that may be used to determine and program line-specific Vcoms onto lines of pixels of an electronic display, in accordance with an embodiment.

Continuing with the drawings, FIG. 9 is a block diagram of a Vcom calibration system 200 that may be utilized to determine optimal Vcoms for each line of pixels 102 of the electronic display 18 as well as supply the lines of pixels 102 with their optimal Vcoms. As illustrated, the Vcom calibration system 200 includes the electronic display 18, the intra-frame interpolation IC 140, a power supply 202, a signal generator 204, a probe 206, a flicker meter 208, a computing system 210, and an oscilloscope 212. The power supply 202 may provide electrical power to the electronic display 18, and the signal generator 204 may control timing associated with the electronic display 18.

The electronic display 18 may display a pattern, such as a pattern that will cause flickering to occur. The probe 206 may be a camera that can detect the flickering and provide data regarding light emitted by the pixels 102 of the electronic display 18 to the flicker meter 208. For instance, the probe 206 may be used to measure flickering at each of the regions 150. Additionally, it should be noted that the sizes of the regions 150 of the electronic display 18 may be based at least in part on characteristics of the probe 206. For example, the sizes of the regions 150 may depend on an aperture setting (e.g., size or number of f-stops) of the probe 206. Accordingly, the sizes of the regions 150 may vary. For example, in some embodiments, the regions 150 may be several millimeters wide, whereas in other embodiments, the regions 150 may be approximately a centimeter wide. The flicker meter 208 may interpret the data provided by the probe 206 and determine flicker curves, which will be discussed in more detail below.

The computing system 210, which may be communicatively coupled to the flicker meter 208 and the intra-frame interpolation IC 140, may determine an optimal Vcom for each region 150. For example, the computing system 210 may include processing circuitry (e.g., one or more microprocessors, programmable logic devices, or a combination thereof) that may execute instructions stored on a non-transitory storage medium of the computing system to determine an optimal Vcom for each region 150 based at least in part on the flicker curve for the region 150.

The computing system 210 may send instructions to the intra-frame interpolation IC 140 to cause the intra-frame interpolation IC 140 to be programmed based at least in part on the determinations made by the computing system 210. The intra-frame interpolation IC 140 may perform intra-frame interpolation to determine an optimal Vcom for each line of pixels 102 based at least in part on the optimal Vcom values for the regions 150. Furthermore, the oscilloscope 212 may be a digital oscilloscope that displays plots of data collected by the intra-frame interpolation IC 140. For example, as discussed below, the plots may be associated with voltage sweeps caused by the intra-frame interpolation IC 140.

Figure 10:
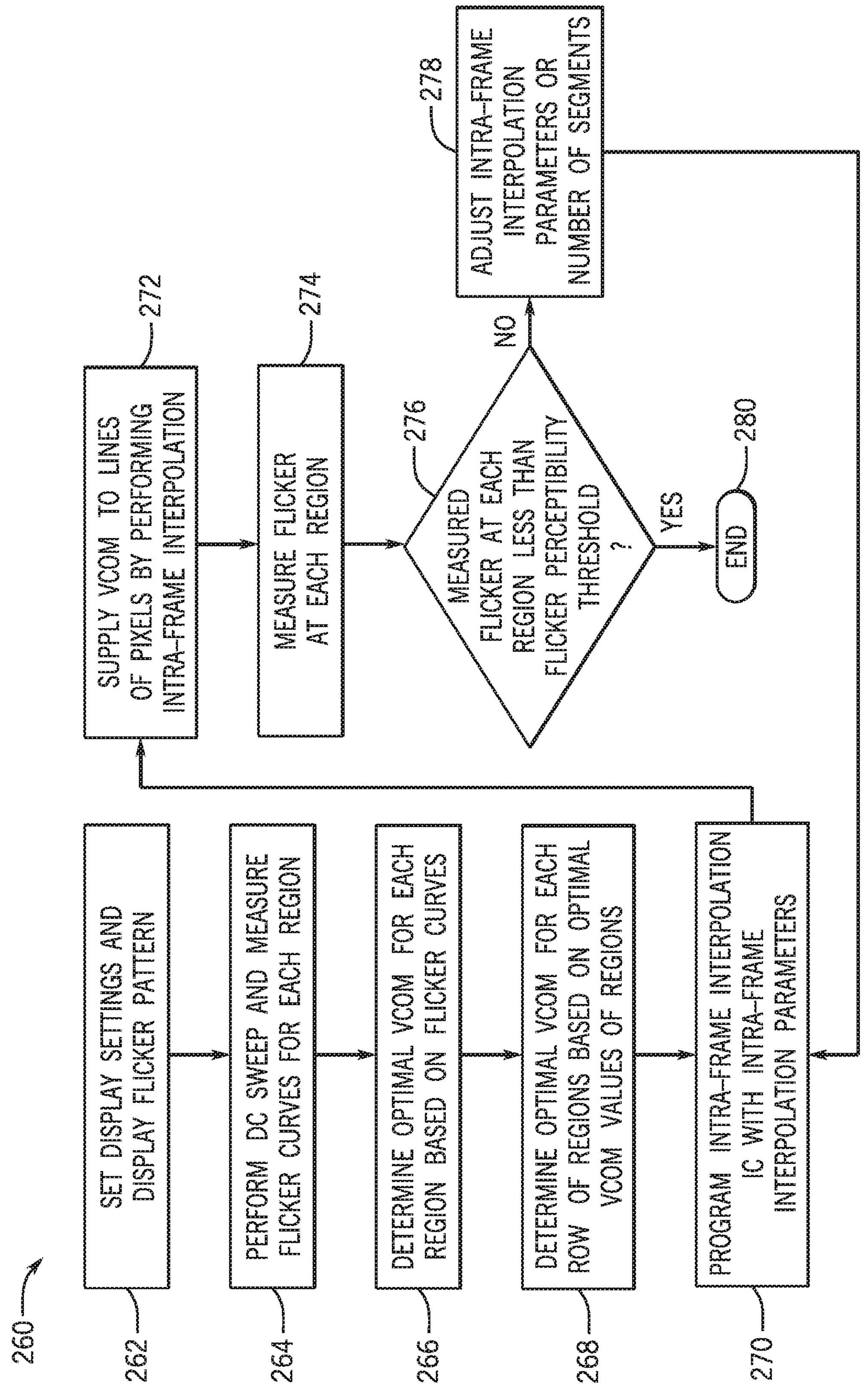
FIG. 10 is process for calibrating the Vcom for lines of pixels of an electronic display, in accordance with an embodiment.

With the foregoing in mind, FIG. 10 is a flow diagram of a process 260 for calibrating the Vcom for the lines of pixels 102 of the electronic display 18. In other words, the process 250 may be performed to determine an optimal Vcom for each line of pixels 102 of the electronic display 18 and to supply each line of pixels 102 with its determined Vcom. The process 260 may be performed by the Vcom calibration system 200. The process 260 generally includes setting display settings of the electronic display 18 and displaying a flicker pattern on the electronic display 18 (process block 262), performing a DC sweep and measuring flicker curves for each region 150 of the electronic display 18 (process block 264), determining an optimal Vcom for each of the regions 150 based at least in part on the flicker curves (process block 266), determining an optimal Vcom for each of the rows 152 based at least in part on the optimal Vcom values for the regions 150 (process block 268), programming the intra-frame interpolation IC 140 with intra-frame interpolation parameters that are determined based at least in part on the optimal Vcom values for the rows 152 (process block 270), supplying Vcom to the lines of pixels 102 of the electronic display 18 by performing intra-frame interpolation (process block 272), measuring flicker at each of the regions 150 (process block 274), determining whether each of the measured flickers associated with the regions 150 is less than a flicker perceptibility threshold (decision block 276), and, when it is determined that one or more of the measured flickers is not less than the flicker perceptibility threshold, adjusting the intra-frame interpolation parameters, a number of segments utilized, or both (process block 278) and returning to program the intra-frame interpolation IC 140 (process block 270). When it is determined that each of the measured flickers is less than the flicker perceptibility threshold, the process 260 may end (process block 280).

At process block 262, settings of the electronic display 18 may be set to prepare the electronic display 18 for testing. For example, settings of the electronic display 18 may be adjusted to settings at which flickers are most likely to be perceived by the human eye and/or the probe 206. For instance, in some embodiments, the refresh rate of the electronic display 18 may be set to a minimum refresh rate of the electronic display 18, which is the lowest refresh rate with which the electronic display 18 is configured to operate.

Additionally, at process block 262, a flicker pattern may be displayed on the electronic display 18. In one embodiment, the flicker pattern may be a pattern in which each pixel 102 is programmed to emit light at a same brightness level (e.g., same gray level).

At process block 264, a DC voltage sweep may be performed. For example, a starting voltage may be applied to pixels 102 of the electronic display 18. The voltage may be incremented (or decremented) until a final voltage is reached. The DC voltage sweep may be utilized in order to measure flicker curves for each region 150 of the electronic display 18, which may also be performed at process block 264. For example, the probe 206 may be used to collect flicker data at voltage utilized in the DC voltage sweep. In other words, the flicker meter 208 may generate flicker curves for each of the regions 150 during a DC voltage sweep of the pixels 102 of the electronic display 18 by utilizing data collected by the probe 206 for each of the regions 150 at the various voltage increments (or decrements) used in the DC voltage sweep.

Figure 11:
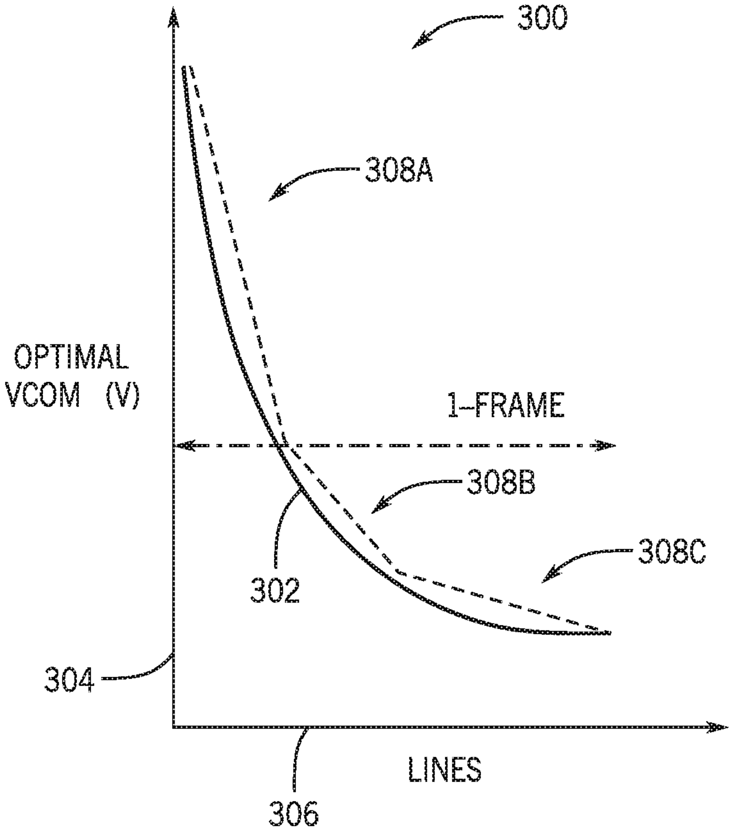
FIG. 11 is a graph of a VCOM curve for reducing (e.g., minimizing) flickering as well as segments associated with intra-frame interpolation, in accordance with an embodiment.

To help elaborate on the flicker curves, FIG. 11 is provided. In particular, FIG. 11 is a graph 300 that includes a flicker curve 302 which indicates an optimal Vcom value (as indicated by axis 304) for each line of pixels 102 of the electronic display 18 (as indicated by axis 306). A flicker curve, such as the flicker curve 302 may be generated for each region 150 of the electronic display 18. It should be noted that the shape of the flicker curve 302 may differ between different electronic displays 18, for example, due to different electronic displays 18 having different characteristics. Additionally, the flicker curve 302 may account for particular content to be displayed, temperature, and the refresh rate of the electronic display 18. The graph 300 also include several segments 308, which are discussed in greater detail below with regard to intra-frame interpolation.

Returning to FIG. 10 and the discussion of the process 260, at process block 266, the computing system 210 may determine an optimal Vcom for each of the regions 150 based at least in part on the flicker curves. For example, the computing system 210 may determine the optimal Vcom values based at least in part on optimal points indicated the flicker curves. Furthermore, at process block 268, the computing system 210 may determine an optimal Vcom for each of the rows 152 based at least in part on the optimal Vcom values for the regions 150. As an example, the computing system 210 may determine the optimal Vcom for a row 152 by determining an average value of the Vcom values of each region 150 included in the row 152. For instance, the computing system 210 may determine an optimal Vcom for the top row 152A by determining the average of the optimal Vcom values for regions 150A-C, the an optimal Vcom for the middle row 152B by determining the average of the optimal Vcom values for regions 150D-F, and the optimal Vcom for the bottom row 152C by determining the average of the optimal Vcom values for regions 150G-I.

At process block 270, the intra-frame interpolation IC 140 may be programmed with intra-frame interpolation parameters, which may include the optimal Vcom values for each of the regions 150, each of the rows 152, and values derived based at least in part on the optimal Vcom values for each of the rows 152 and based at least in part on characteristics of the electronic display 18. For example, the intra-frame interpolation parameters may also include the number of lines of pixels 102 included in the electronic display 18. Additionally, the intra-frame interpolation parameters may include the number of frames 308 to be used while performing intra-frame interpolation.

At process block 272, the intra-frame interpolation IC 140 may supply a Vcom to each line of pixels 102 of the electronic display 18 by performing intra-frame interpolation based at least in part on the intra-frame interpolation parameters. In particular, the intra-frame interpolation IC 140 may determine a line-specific Vcom for each line of pixels 102 based at least in part on the location of the line of pixels 102 relative to the rows 152 and the determined optimal Vcom values for the rows 152. For example, for a row of pixels 102 located between the top row 152A and the middle row 152B, the intra-frame interpolation IC 140 may determine the Vcom for the row of pixels 102 based at least in part on the optimal Vcom of the top row 152A and the optimal Vcom of the bottom row 152B. The optimal Vcom for the row of pixels 102 may be a voltage that is equal to the optimal Vcom of the top row 152A or the optimal Vcom of the bottom row 152B or a voltage that is between the optimal Vcom of the top row 152A and the optimal Vcom of the bottom row 152B.

More particularly, the intra-frame interpolation IC 140 may determine the optimal Vcom for a particular row of pixels by performing an interpolation on a flicker curve. Referring back to FIG. 11, intra-frame interpolation IC may determine a number of segments 308 and generate the segments 308 for the flicker curve 302. The intra-frame interpolation IC 140 may determine a value (e.g., a Vcom value) for a particular line of pixels 102 by determining a voltage that corresponds to a location along the axis 306 associated with the location of the line of pixels 102 within the electronic display 18. It should be noted that while the illustrated embodiment include three segments 308, in other embodiments, fewer (e.g., one or two) or more (e.g., four, five, six, or more) segments may be utilized when performing intra-frame interpolation. Furthermore, while the segments 308 are generally indicative of performing linear interpolation, in other embodiments, different types of interpolation may be performed. For instance, polynomial interpolation or spline interpolation may be used.

Figure 12:
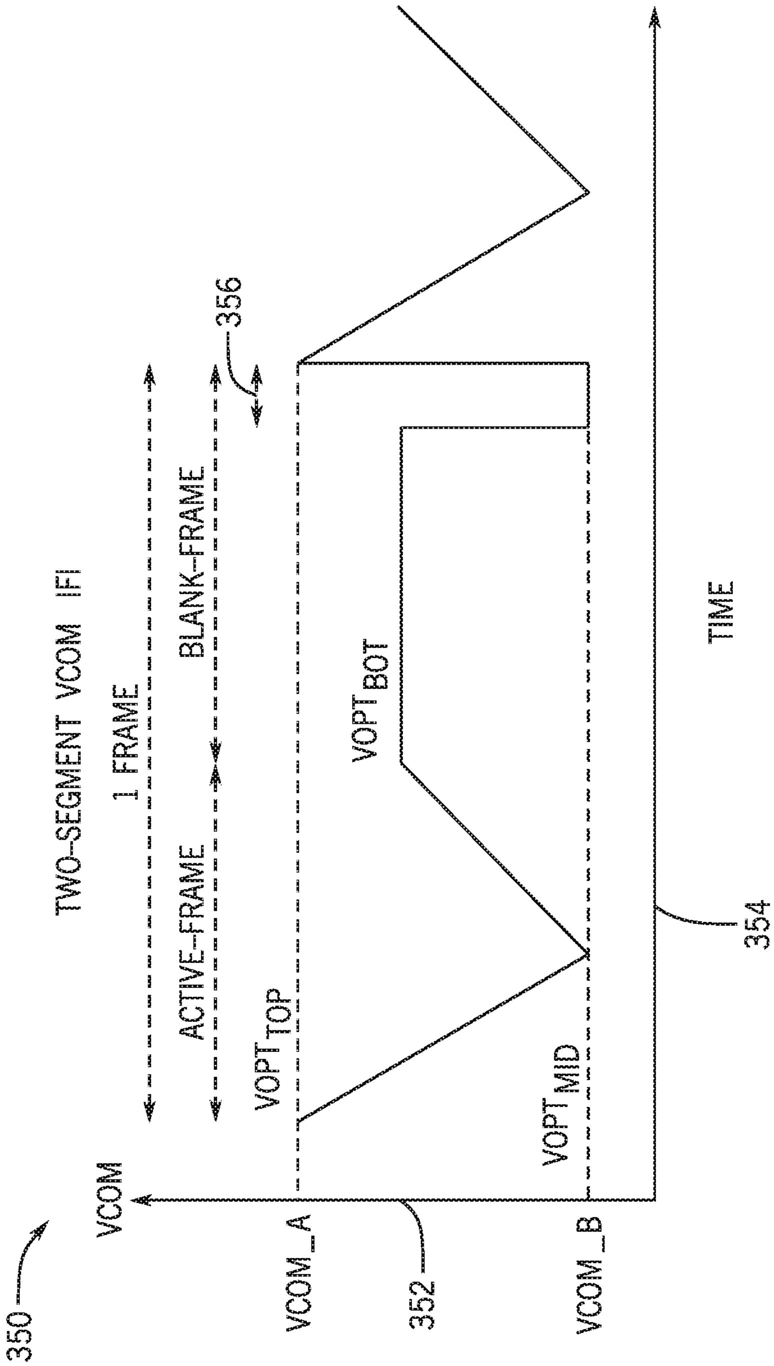
FIG. 12 is an example of timing diagram associated with performing intra-frame interpolation, in accordance with an embodiment.

Continuing the drawings, FIG. 12 is a timing diagram 350 associated with performing intra-frame interpolation using two segments 308 that may be displayed via the oscilloscope 212. More particularly, the timing diagram 350 illustrates changes in Vcom (indicated by vertical axis 352) over time (indicated by horizontal axis 354), such as during an active-frame period and a blank-period that occurs during the duration of one frame of content. During the active-frame period, pixels 102 of the electronic display 18 may be programmed based at least in part on content to be displayed. The Vcom supplied to the pixels 102 may start at a first voltage, such as the optimal Vcom associated with the top row 152A of regions 150, transition to a second voltage, such as the optimal Vcom associated with the middle row 152B of regions 150, and transition to a third voltage, which may be the optimal Vcom associated with the bottom row 152B of the regions 150.

The blank-frame period may be associated with a time when a pixel 102 is not being programmed. During the blank-frame period, the Vcom associated with the bottom row 152B may be maintained, for instance, until a blanking period 356 is reached. During the blanking period 356, pixels 102 may be reset in preparation to be programmed for a subsequent frame of image data.

Returning to FIG. 10 and the discussion of the process 260, at process block 274, the amount of flickering (e.g., flicker level) at each of the regions 150 may be measured using the probe 206. For example, as described above, the probe 206 may be a camera that can be used to record image data for various portions (e.g., regions 150) of the electronic display 18. The flicker meter 208 may analyze the data collected by the probe 206 and indicate an amount of flicker (e.g., an amount in decibels).

At decision block 276, the computing system 210 may determine whether each of the measured flickers associated with the regions 150 is less than a flicker perceptibility threshold, which may be a pre-defined value that is stored in memory or storage of the computing system 210. More specifically, the flicker perceptibility threshold may be a value indicative of a point at which the human eye can perceive flickering. When the computing system 210 determines that one or more of the measured flickers associated with the regions exceeds the flicker perceptibility threshold, at process block 278, the intra-frame interpolation parameters may be adjusted, the number of segments may be modified, or both the intra-frame interpolation parameters and the number of segments may be changed. For example, the optimal Vcom values associated with the regions 150, rows 152, or both may be modified. As another example, the type of interpolation may be modified (e.g., switching from linear interpolation to spline interpolation). The process 260 may return to process block 270 at which the intra-frame interpolation IC may be programmed with the adjusted intra-frame interpolation parameters (which may include a modified number of segments utilized when performing the intra-frame interpolation).

However, when it is determined at decision block 276 that each measured flicker is less than the flicker perceptibility threshold, the process 260 may end, as indicated by process block 280. In other words, the Vcom values for the lines of pixels may be considered to be calibrated.

Moreover, it should be noted that while the present disclosure generally describes Vcom being provided by one source (e.g., a voltage source associated with the intra-frame interpolation IC 140), in other embodiments, multiple Vcom voltage sources may be utilized. That is, the process 260 may be performed when more than one Vcom source is used. For example, the regions 150 may be modified to account for the multiple voltage sources. In other words, for example, more or fewer regions 150 may be used, the regions 150 may be located in different parts of the display 18, or both. Accordingly, it should be appreciated that the presently disclosed techniques may be utilized when there are multiple Vcom sources.

Furthermore, while the presently disclosed techniques may be utilized to determine and provide line-specific Vcom values, it should be noted that these techniques may also be utilized to determine and provide Vcom voltages for more than one line. In other words, intra-frame interpolation may be performed to determine an optimal Vcom for a portion of the electronic display 18, such as a portion of the electronic display 18 that includes two or more lines of pixels 102. In such as case, the optimal Vcom may be determined, for example, by determining an average value of the line-specific Vcom values for the lines of pixels 102 included in the portion of the electronic display 18. In other words, intra-frame interpolation may be utilized to provide area-specific Vcom voltage values to an area of the display that includes, for example, a single line of pixels 102 (e.g., associated with one common electrode 112) or two or more lines of pixels 102 (e.g., associated with one or more common electrodes 112).

The techniques discussed herein enable electronic devices to provide line-specific Vcoms to lines of pixels included in electronic displays. For instance, an intra-frame interpolation IC 140 may cause line-specific Vcoms to be supplied to lines of pixels 102 included in an electronic display 18 based at least in part on optimal Vcom values associated with rows 152 of regions 150 of the electronic display 18. Providing line-specific Vcoms to the lines of pixels 102 of the electronic display 18 may reduce or eliminate the occurrence of flickering that is perceptible to the human eye. For instance, by providing line-specific Vcoms, there may be a smaller range of Vcoms observed across the regions 150, and each of these Vcoms may be associated with an amount of flickering that the human eye cannot perceive. Furthermore, providing line-specific Vcoms may reduce or eliminate the occurrence of flicking caused by drifts in Vcom over time.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system comprising:

an integrated circuit configured to:

determine a first line-specific common voltage (Vcom) for a first line of pixels of a plurality of lines of pixels of an electronic display by interpolating between a first Vcom of a plurality of common voltages (Vcoms) and a second Vcom of the plurality of Vcoms, wherein the first Vcom is associated with a first row of regions of a plurality of rows of regions of the electronic display, wherein the second Vcom is associated with a second row of regions of the plurality of rows of regions, wherein the first line of pixels is located between the first row of regions and the second row of regions, wherein each respective Vcom of the plurality of Vcoms is associated with a respective row of regions of the plurality of rows of regions of the electronic display, wherein each row of the plurality of rows comprises more than one line of pixels;

determine a second line-specific Vcom for a second line of pixels of the electronic display by interpolating between the second Vcom of the plurality of Vcoms and a third Vcom of the plurality of Vcoms, wherein the second line of pixels is located between the second row of regions and a third row of regions of the plurality of rows of regions, wherein the third Vcom is associated with the third row of regions; and cause the first line-specific Vcom to be provided to the first line of pixels and the second line-specific Vcom to be provided to the second line of pixels.

2. The system of claim 1, wherein the integrated circuit is configured to:

determine a second plurality of Vcoms different from the plurality of Vcoms, wherein each respective Vcom of the second plurality of Vcoms is associated with a respective region of a plurality of regions of the electronic display, wherein each row of regions of the plurality of rows of regions of the electronic display includes a portion of the plurality of regions of the electronic display; and determine the plurality of Vcoms based at least in part on the second plurality of Vcoms.

3. The system of claim 2, comprising:

a probe configured to collect optical data regarding the plurality of regions; and a flicker meter configured to receive the optical data from the probe and determine a flicker curve for each region of the plurality of regions.

4. The system of claim 3, wherein the integrated circuit is configured to determine each respective Vcom of the second plurality of Vcoms based at least in part on a respective flicker curve.

5. The system of claim 3, wherein a size of each region of the plurality of regions corresponds to an aperture setting of the probe.

6. A method, comprising:

determining a plurality of common voltages (Vcoms), wherein each respective common voltage (Vcom) of the plurality of Vcoms is associated with a respective row of a plurality of rows of regions of an electronic display, wherein each respective row of the plurality of rows of regions comprises a respective plurality of lines of pixels of the electronic display;

determining, based on the plurality of Vcoms, a plurality of area-specific Vcoms for a plurality of common electrodes of the electronic display, wherein the plurality of area-specific Vcoms differs from the plurality of Vcoms, wherein each of the plurality of area-specific Vcoms is associated with one or more lines of pixels of a respective plurality of lines of pixels, wherein the one or more lines of pixels form a less than entire portion of the respective plurality of lines of pixels; and providing the plurality of area-specific Vcoms to the one or more lines of pixels of the plurality of pixels.

7. The method of claim 6, wherein determining the plurality of area-specific Vcoms comprises determining Vcoms that are each associated with two or more lines of pixels of the plurality of pixels.

8. The method of claim 6, wherein determining the plurality of area-specific Vcoms comprises determining a second plurality of Vcoms, wherein each Vcom of the second plurality of Vcoms is determined by interpolating between two Vcoms of the plurality of Vcoms.

9. An electronic device comprising:

an electronic display comprising a plurality of lines of pixels, a plurality of common electrodes, a plurality of regions, and a plurality of rows of regions of the plurality of regions, wherein each region of the plurality of regions comprises a portion of the plurality of common electrodes and two or more lines of pixels of the plurality of lines of pixels; and an integrated circuit configured to:

determine a plurality of line-specific common voltages (Vcoms) by determining a respective common voltage (Vcom) for each respective line of the plurality lines of pixels based on a plurality of Vcoms and a respective location of each respective line of pixels within the electronic display, wherein the plurality of Vcoms is determined by determining a respective Vcom for each respective row of the plurality of rows of regions of the electronic display, wherein the plurality of line-specific Vcoms is different than plurality of Vcoms; and cause the determined plurality of line-specific Vcoms to be provided to the plurality of lines of pixels.

10. The electronic device of claim 9, wherein the plurality of regions comprises at least nine regions.

11. The electronic device of claim 10, wherein each row of the plurality of rows of regions is formed by three regions of the plurality of regions.

12. The electronic device of claim 9, wherein the electronic device comprises a computer, a mobile phone, a tablet, or a portable media device configured to use the electronic display to convey information to a person with reduced image artifacts.

13. The electronic device of claim 9, wherein the integrated circuit is configured to:

determine a first line-specific Vcom of the plurality of line-specific Vcoms for a first line of pixels of the plurality of lines of pixels by interpolating between:

a first Vcom of the plurality of Vcoms associated with a first row of regions of the plurality of rows of regions; and a second Vcom of the plurality of Vcoms associated with a second row of regions of the plurality of rows of regions; and determine a second line-specific Vcom of the plurality of line-specific Vcoms for a second line of pixels of the plurality of lines of pixels by interpolating between:

the second Vcom of the plurality of Vcoms associated with the second row of regions of the plurality of rows of regions; and a third Vcom of the plurality of Vcoms associated with a third row of regions of the plurality of rows of regions.

14. The electronic device of claim 9, wherein each line of pixels of the plurality of lines of pixels is located within three regions of the plurality of regions.

* * * * *